United States Patent [19]

Cheysson et al.

[11] 4,191,651
[45] Mar. 4, 1980

[54] SEPARATOR FOR TWO IMMISCIBLE LIQUIDS

[75] Inventors: Philippe J. Cheysson; Luc Delons; Yvon J. Le Guen, all of Le Havre, France

[73] Assignee: Exxon Research & Engineering Co., Florham Park, N.J.

[21] Appl. No.: 879,414

[22] Filed: Feb. 21, 1978

[30] Foreign Application Priority Data

Feb. 23, 1977 [FR] France .................................. 77 05315

[51] Int. Cl.² .............................................. B01D 23/16
[52] U.S. Cl. ....................................... 210/265; 210/274; 210/275; 210/279; 210/522; 210/DIG. 5
[58] Field of Search ................... 210/23 R, 27, 32, 34, 210/73 W, 82, 265, 269, 274, 275, 279, 513, 522, DIG. 5

[56] References Cited

U.S. PATENT DOCUMENTS

| | | | |
|---|---|---|---|
| 3,558,482 | 1/1971 | De Young | 210/265 |
| 3,830,371 | 8/1974 | Garcia | 210/265 |
| 3,852,193 | 12/1974 | Jakubek et al. | 210/265 |
| 3,925,202 | 12/1975 | Hirs | 210/275 X |

FOREIGN PATENT DOCUMENTS 897789  5/1962  United Kingdom ...................... 210/265

*Primary Examiner*—Charles N. Hart
*Assistant Examiner*—Ferris H. Lander
*Attorney, Agent, or Firm*—Donald F. Wohlers

[57] ABSTRACT

A separator suitable for the separation of a first liquid of relatively lower specific gravity and a second liquid of relatively higher specific gravity from a liquid mixture containing both liquids, the liquids being mutually immiscible, the separator comprising an inlet for introducing the mixture into a first separation zone so constructed and arranged as to promote the separation by gravity of a substantial part of the first liquid from the mixture, a first liquid outlet for the discharge of separated first liquid from the separator, a second liquid outlet for the discharge of separated second liquid from the separator, means for causing first liquid separated in the first separation zone to pass to the first liquid outlet, means for causing the remaining liquid mixture containing a minor proportion of the first liquid and a major proportion of the second liquid to pass towards the second liquid outlet along a flow path including a part extending downwardly through a second separation zone partially filled with a liquid-permeable bed of powdered filter material which is active for retaining and coalescing droplets of the first liquid, and means for causing the resulting liquid to pass from the bottom of the liquid-permeable bed to the second liquid outlet.

5 Claims, 3 Drawing Figures

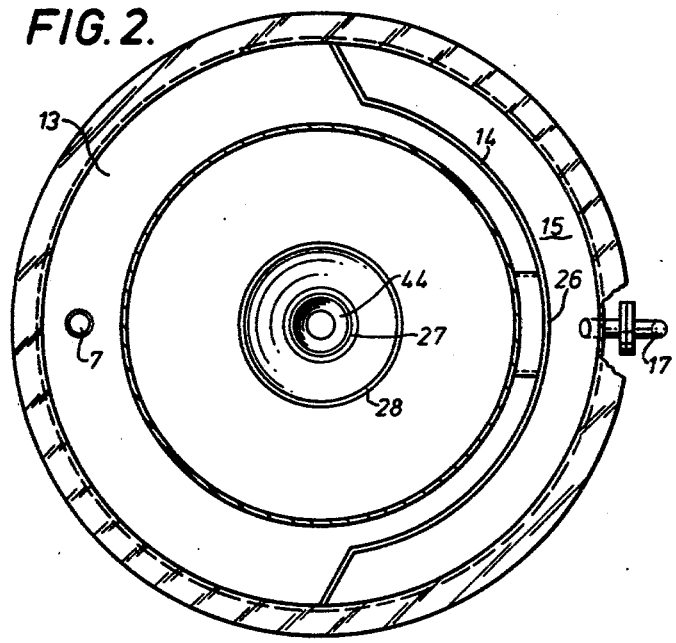
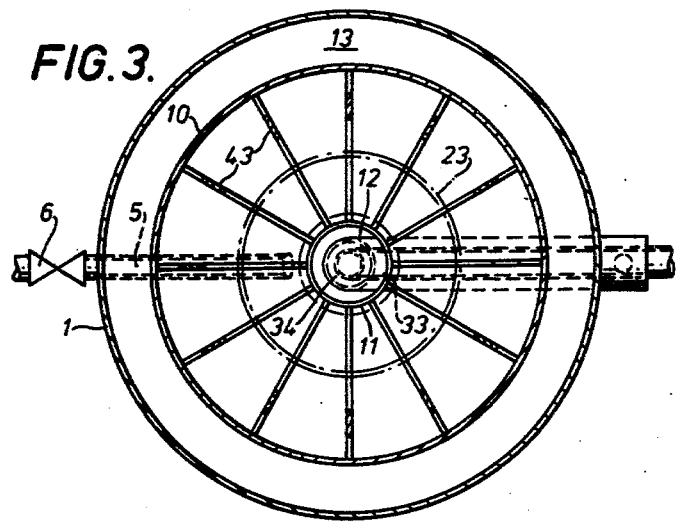

SEPARATOR FOR TWO IMMISCIBLE LIQUIDS

The present patent concerns a separator operating on gravity and suction with integrated filters in the circuit. This separator is designed for the separation of mixtures of two non-miscible liquids having different densities, in particular, mixtures of water and hydrocarbons.

Purification equipment is already known for water polluted by hydrocarbons, using separators working by gravity to obtain the separation of constituents in the different densities. The degree of purity of the outgoing water depends greatly on the difference of density between the constituents, on the emulsion of the hydrocarbon droplets, on the quality of sediment attached to the droplets and increasing the apparent density, and eventually on the detergent content.

The degree of purity of the water obtained with the known separator, which is expressed in parts per million (p.p.m.) is, in general, not lower than 50 ppm or even 100 ppm when the hydrocarbon is very emulsified.

The present invention aims therefore at remedying this inconvenience, inherent to known separation processes, by creating a separator which, despite its reduced volume, allows purity degrees of a few ppm only to be reached.

The present invention comprises a separator suitable for the separation of a first liquid of relatively lower specific gravity and a second liquid of relatively higher specific gravity from a liquid mixture containing both liquids, the liquids being mutually immiscible, the separator comprising an inlet for introducing the mixture into a first separation zone so constructed and arranged as to promote the separation by gravity of a substantial part of the first liquid from the mixture, a first liquid outlet for the discharge of separated first liquid from the separator, and a second liquid outlet for the discharge of separated second liquid from the separator, means for causing first liquid separated in the first separation zone to pass to the first liquid outlet, means for causing the remaining liquid mixture containing a minor proportion of the first liquid and a major proportion of the second liquid to pass towards the second liquid outlet along a flow path including a part extending downwardly through a second separation zone containing a liquid-permeable bed of solid material which is active for retaining and coalescing droplets of the first liquid, and means for causing the resulting liquid to pass from the bottom of the liquid-permeable bed to the second liquid outlet.

In accordance with a preferred embodiment of the invention the separator consists of a tank. A dome shaped upper part of this tank is fitted with a vent and accommodates the feed-pipe for the mixture to be separated and the rod of a float. A cone shaped lower part of the tank is fitted with a sediment outlet pipe and outlet pipes for the purified dense liquid. The tank possesses internal partitions which, overlapping each other, form a pre-separator and a gravity separator. The partially treated dense liquid flows out on the free surface at atmospheric pressure under the dome, and the separated light liquid drains automatically, since the tank also contains a pre-filter and a filter with a filtration media having coalescent power, operating under vacuum created by a pump fitted in the outlet pipe.

Various other features of the invention can be seen in the following detailed description.

One preferred form of the separator is represented on the accompanying drawings in which:

FIG. 2 is a cross-section following the line II—II on FIG. 1

FIG. 3 is a cross-section following the line III—III on FIG. 1.

Figure 1:
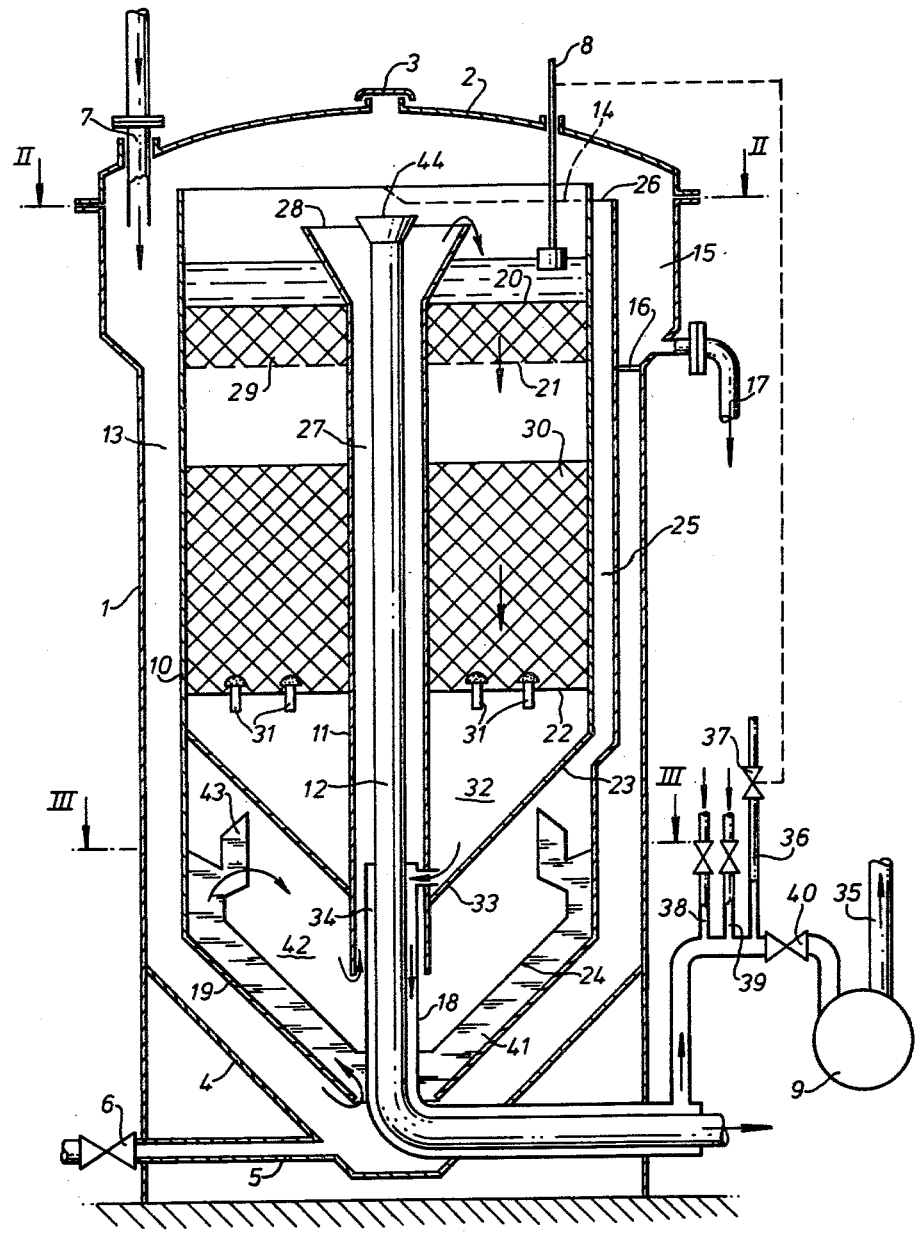
FIG. 1 is a vertical section of a sketch of the separator according to the invention

The separator illustrated on FIG. 1 consists of a cylindrical envelope 1 with vertical axis and forming a tank, the upper part of which is dome shaped 2, and is fitted with a vent 3, the mixture feed pipe 7 and the rod 8 of a float, controlling a suction pump 9 situated at the separator outlet. A pipe 5 fitted with a valve 6, for the periodical draining of sediments, is connected to the cone shaped lower part 4 of the envelope. The latter contains two cylindrical surfaces 10, 11 concentric to the vertical axis of the envelope 1 and at a certain distance from each other these surfaces 10, 11 are opened at their upper parts and encircle a central tube 12 which, at its lower end from a certain level is itself encircled, leaving an annular space, by a pipe 18 of bigger diameter. The latter is connected via a valve 40 to the suction pump 9.

The cylindrical surfaces 1 and 10 form an annular volume 13 serving as a gravity pre-separator, which widens towards the top to form the hydrocarbon collecting compartment 15, as is clearly shown on FIG. 2. This collecting compartment 15 is bounded by an auxiliary vertical partition 14 represented by a dotted line of FIG. 1. This partition 14 occupies approximately half circumference of the envelope 1. A horizontal partition 16 constitutes the bottom of the collecting compartment 15. The upper horizontal edge of the auxiliary partition 14 is used as an overflowing edge for the hydrocarbon layer separated in the pre-separator 13 and flowing into compartment 15. The hydrocarbons so collected are discharged via pipe 17.

The cylindrical surface 10, which is prolonged at its lower end by a truncated cone 19, the cylindrical surface 11 as well as the tubular conduit 18 define several annular volumes by successive cylindrical partitions 20, 21 and 22 and successive conical partitions 23 and 24.

The inlet collector 41 situated at the lower end and constituted by the annular volume defined by the truncated cones 19 and 24 and partitioned by the radial baffles or fins 43 serving to guide the water streams and the coalescene of the oil (see FIG. 3).

Above the annular collector 41, the volume 42, forming the gravity separator, is defined by truncated cone 24, the tubular conduit 18, the cylindrical surface 11 and the lower face of the truncated cone 23. This gravity separator 42 is extended upwards by the vertical chimney roughly rectangular 25, the upper edge of which constitutes the over flowing weir 26 for the recovery of the oil flowing to the collecting compartment 15.

The volume of the gravity separator 42 also communicates with an annular water discharge chimney 27 formed by the cylindrical surface 11 and the external wall of the central tube 12. The latter is terminated at its upper end by a truncated cone the edge of which 28, in the open, constitutes an overflow weir for the water and the reference level of the liquids present in the pre-separator 13 and in the separator 42. In this manner it is possible to recover automatically, and continuously, the oil separated by the overflow weirs 14 and 26.

The pre-filter 29 is placed in the upper part of the separator and inside a compartment formed by the horizontal perforated partitions 20 and 21. This filter consists of a pulverulent media (sand gravel, plastic granules or equivalent) forming a filtering bed which by its granulometry opposes the passage of particles making up the filter described below during the counter flow de-clogging and washing operations of this filter.

The middle section contains the actual filter 30 which is placed within the space formed by the horizontal partitions 21 and 22. Partition 22 is fitted with a great number of mushroom shaped sieves drilled with holes of a diameter smaller than the guage of the filtering bed elements, the role of which is essentially to distribute and diffuse the injected mixture of water and compressed air during the counter flow washing of filter 30. In the case of hydrocarbons separation, the filtering bed is made of oleophile material with fine granulometry, occupying approximately two-thirds of the compartment height. The olephile materials which are most preferred to the separation of hydrocarbon oils from water are complexes formed by an amine bound to a substrate through a binding reagent which is preferably an acid chloride. Useful substrates include untreated clays such as kaolinite, bentonite or montmorillonite or crushed bricks or crushed glass or glass beads. Suitable amines include aliphatic amines containing 6 to 20 carbon atoms or araliphatic amines or aromatic amines.

The material most preferred as the powdered filter material for the separation of hydrocarbons from water is that sold by Creusot-Loire under the Trade Name "Materiel Oleophile Creusot-Loire" Filter 30 is situated above a volume formed by horizontal partition 22 and the truncated cone 23, which constitutes the water collector 32. The truncated cone 23 is terminated at its upper end by the discharge orifice 33, opening in the annular water discharge conduit 34 which is defined by the cylindrical surfaces 12 and 18. This conduit 24 is connected via valve 40 the self-priming suction pump 9 discharging the sucked water in conduit 35. Between the separator and the pump three conduits 36, 38 and 39 are connected to conduit 34, and conduit 36 fitted with valve 37 is mechanically or electrically linked to the float 8. Depending on the level of the liquid in the filtering compartments this float ensures, by controlling the suction of pump 9, that the level of the liquid is sufficient to submerge the pre-filter and filter. Conduits 38 and 39, also equipped with valves, enable respectively the injection of washing water under pressure and of the compressed air in order to carry out periodical counter flow cleaning of these filters. During the cleaning operation, the pump 9 is isolated by means of valve 40.

The washing water is recovered through the overflow 44, consisting of an inverted truncated cone with its upper edge lower than that of the regulator 28. The washing water is discharged by pipe 12 and is eventually purified.

In the invention the separator operates as follows:

The mixture of the two non-miscible liquids arrives at the top of the separator via conduit 7, falls into the pre-separator whilst the oil is pre-separated and accumulates in the upper section defined by a horizontal surface at the level of the oil discharging edge 14 being at atmospheric pressure. As the accumulation of pre-separated oil proceeds, it is discharged over the edge and collected in compartment 15 where it is evacuated by gravity through pipe 17.

The pre-separated mixture then flows via the lower section of the inlet collector 41 into the separator 42 which is partitioned with radial baffles 43 activating the coalescence of the oil. After going through the separator 42 in a centripetal manner, the mixture is discharged through chimney 27.

The separated oil is gathered at the upper part of the separating volume and then accumulates in the discharge chimney 25 whence it flows over the edge 26 into the collecting compartment 15. The cleaned water climbs through the annular chimney 27 and reaches the free surface at atmospheric pressure; the level of this free surface is determined by the overflow 28. The levels of the oil overflows 26 and 14 are higher than this reference level 28 so as to prevent water flowing into the collecting compartment 15, but still allowing an automatic discharge of the oil due to the density difference water-oil and the pressure drop of the mixture after its passage through the preseparator and the separator.

After going over the overflow 28, the cleaned water successively passes through the pre-filter 29 and the filter 30 with an adequate flow thanks to the suction effect of the self-priming pump 9. The flow of this pump is controlled by the float 8 so that the prefilter and the filter are always submerged. The small particles of oil still in suspension in the water are stopped by the oleophile and coalescent actions of the filtering bed. The cleaned water is discharged through the pump 9 and the pipe 35.

When the pressure of the suction circuit of pump 9 reaches a critical value indicating that the filter is clogged, the separation process stops and the filter is cleaned and washed. To do this, the arrival of polluted mixture is stopped, valve 40 is closed and valves 38 and 39 are opened letting in pressurised water and compressed air respectively. This mixture passes through the filtering bed, at counter flow, going through the mushroom shaped sieves. Because of the free space above the filtering bed and the agitation created by the compressed air, the filtering media is placed in suspension and cleaned. The filter bed particles are retained by the prefilter, the washing water and the recovered oil going through the prefilter and discharged through the overflow 44 and re-enter the separation circuit of the mixture to be separated.

Between two separate processes, the separator remains full of liquid. The sediments which accumulate at the bottom of the separator are periodically discharged by means of valve 6.

The invention is not limited to the example of realisation represented and described in detail, since various modifications could be introduced still within the framework.

The separator can, for instance, have several separating volumes side by side; the prefilter could be fitted on its lower horizontal surface with pressurized water inlet pipes and compressed air inlet pipes so that it could be cleaned on its own. By deleting the horizontal partition 20, the prefilter could be made into a sieve, of an adequate porosity, supported by or replacing the horizontal partition 21.

What we claim is:

1. A separator suitable for the separation of a first liquid and a second liquid having a higher specific gravity than the first liquid from a liquid mixture containing both liquids, the liquids being mutually immiscible, the separator comprising an inlet for introducing the mixture into a first separation zone so constructed and arranged as to promote the separation by gravity of a substantial part of the first liquid from the mixture, a first liquid outlet for the discharge of separated first liquid from the separator, a second liquid outlet for the discharge of separated second liquid from the separator, means for causing first liquid separated in the first separation zone to pass to the first liquid outlet, means for causing the remaining liquid mixture containing a minor proportion of the first liquid and a major proportion of the second liquid to pass towards the second liquid outlet along a flow path including a part extending downwardly through a second separation zone, said second separation zone including an upper horizontally extending pre-filter zone contained between upper and lower perforated plate means, and a lower main filter zone disposed below said pre-filter zone, said main filter zone being partially filled with a liquid-permeable bed of powdered filter material whereby a vertically extending unfilled chamber is defined between the top of the powdered filter material and the lower perforated plate means, means for drawing fluid from the bottom of the main filter zone to the second liquid outlet, and means for periodically interrupting the separation of the mutually immiscible liquids and backwashing the second separation zone with an up-flowing mixture of the second liquid and a gas to agitate and suspend said powdered filter material in the main filter zone in the chamber below said pre-filter zone, said pre-filter zone preventing further upward travel and loss of said powdered filter material from said separator during backflushing.

2. A separator as claimed in claim 1 wherein a flow mechanism is provided to ensure that the liquid level is permanently above the pre-filter zone in the second separation zone.

3. A separator as claimed in claim 1 or 2 wherein pumping means are provided for drawing the second liquid downwardly through the second filtration zone under reduced pressure, together with means for removing and discharging the separated second liquid.

4. A separator as claimed in claim 1 or 2 wherein means are provided for returning the back-wash to storage for unseparated liquids.

5. A separator according to claim 1 consisting of a vertical cylindrical envelope forming a tank, the dome-shaped upper part of which is fitted with a vent and the mixture inlet pipe and the rod of a float; the lower part of this envelope in the shape of a truncated cone, is fitted with a sediment drainpipe and outlet pipes of the dense cleaned liquid in that the envelope possesses internal partitionings which are fitted together to form a pre separator and a gravity separator, the discharge of the partially treated dense liquid being made on a free surface at atmospheric pressure under dome and the draining of the separator light liquid being done automatically in that envelope also contains a pre filter and a filter containing a filtration media with coalescent power, operating under suction created by a pump incorporated in the outlet pipe.

* * * * *